(12) United States Patent
Numata

(10) Patent No.: US 8,599,414 B2
(45) Date of Patent: Dec. 3, 2013

(54) PRINTING SYSTEM, CONTROL METHOD, STORAGE MEDIUM

(75) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 13/269,132

(22) Filed: Oct. 7, 2011

(65) Prior Publication Data

US 2012/0086980 A1   Apr. 12, 2012

(30) Foreign Application Priority Data

Oct. 12, 2010   (JP) ................. 2010-229654

(51) Int. Cl.
*G06F 15/16*   (2006.01)
*G06F 3/12*   (2006.01)

(52) U.S. Cl.
USPC ......... 358/1.15; 358/1.13; 358/1.1; 358/1.16; 358/400; 709/201; 709/202; 709/203; 709/217; 709/219; 709/218

(58) Field of Classification Search
USPC ......... 358/1.11–1.18, 1.1, 400; 709/201–203, 709/217–219
See application file for complete search history.

(56) References Cited

U.S. PATENT DOCUMENTS

| 6,970,263 | B2 * | 11/2005 | Suzuki et al. ............... 358/1.15 |
| 7,215,435 | B2 * | 5/2007 | Oshima ....................... 358/1.15 |
| 7,970,817 | B2 * | 6/2011 | Hagiuda et al. ............. 709/203 |
| 2004/0049578 | A1 * | 3/2004 | Ohara .......................... 709/224 |
| 2007/0186278 | A1 * | 8/2007 | Fujii et al. ....................... 726/5 |
| 2009/0323112 | A1 * | 12/2009 | Kamei et al. ................ 358/1.15 |
| 2010/0036905 | A1 * | 2/2010 | Shima .......................... 709/203 |
| 2010/0171973 | A1 * | 7/2010 | Kimura ........................ 358/1.14 |

FOREIGN PATENT DOCUMENTS

JP   2010-160579 A   7/2010

* cited by examiner

*Primary Examiner* — Chad Dickerson

(74) *Attorney, Agent, or Firm* — Canon U.S.A., Inc., IP Division

(57) ABSTRACT

A system and method for registering an image forming apparatus in a print server when the image forming apparatus is used on a temporarily basis, and for unregistering the image forming apparatus from the print server after the temporary use ends.

6 Claims, 18 Drawing Sheets

FIG.9

| ACCOUNT 901 | CREDIT 902 | MAC ADDRESS 903 | PRINT DATA TRANSMISSION DESTINATION 904 | REGISTRATION FORM 905 | COLOR PRINTING 906 | TWO-SIDED PRINTING 907 | PRINT DATA 908 | PROCESSING STATE 909 |
|---|---|---|---|---|---|---|---|---|
| UserA | xxxx-xxxx | xxxx-xxxx-xxxx | http://xxx | TEMPORARY REGISTRATION | ○ | ○ | xxxx.pdf | BEING TRANSMITTED |
| UserA | xxxx-xxxx | xxxx-xxxx-xxxx | http://xxx | TEMPORARY REGISTRATION | ○ | ○ | yyyy.pdf | BEING CONVERTED |
| UserA | xxxx-xxxx | yyyy-yyyy-yyyy | — | NORMAL REGISTRATION | × | ○ | — | — |
| UserA | xxxx-xxxx | zzzz-zzzz-zzzz | http://zzz | NORMAL REGISTRATION | ○ | ○ | — | — |
| UserB | | bbbb-bbbb-bbbb | http://bbb | NORMAL REGISTRATION | ○ | ○ | — | — |

PRINTING SYSTEM, CONTROL METHOD, STORAGE MEDIUM

BACKGROUND OF THE INVENTION

1. Field of the Invention

The present invention relates to a printing system, a control method, and a storage medium.

2. Description of the Related Art

The present invention relates to a printing system, a print conversion server that supplies print data, a portable device, a control method, and a program.

In recent years, as forms for executing various processes on a server side, technologies such as a cloud computing system and software as a service (SaaS) have begun to be used. One of such technological services is a print service for registering an image forming apparatus in a server through the Internet and designating the image forming apparatus in the server from a client to instruct printing. The print service is advantageous in that since the server generates print data, it is not necessary to install a printer driver in the client.

Japanese Patent Application Laid-Open NO. 2010-160579 discusses a method for registering an image forming apparatus in a server through the Internet by automatically extracting configuration information of the image forming apparatus to utilize print services.

As a use case where the client does not wish to install any printer driver, the client may temporarily use the image forming apparatus away from home or at a convenience store. In such a case, when the image forming apparatus is not registered in the server, it is difficult to request a device administrator at a user's visiting place to register the image forming apparatus in order to acquire permission of temporary use. One of the reasons for that is time and labor that the user imposes on the device administrator to register an account of the image forming apparatus only for temporary use.

Another problem is illegal use of an image forming apparatus at a visited place after it has been registered and temporarily used. For example, it is necessary to prevent printing at the image forming apparatus of the visited place after the user has left the place.

SUMMARY OF THE INVENTION

The present invention is directed to a printing apparatus that can easily register an image forming apparatus in a server when the image forming apparatus is temporarily used, and quickly release the registration of the image forming apparatus from the server after an end of the temporary use.

According to an aspect of the present invention, a printing system includes a print conversion server configured to supply print data, an image forming apparatus configured to execute printing based on the print data, and a portable device. The portable device includes an acquisition unit configured to acquire device information from the image forming apparatus to print the print data supplied from the print conversion server by the image forming apparatus, and a requesting unit configured to request the print conversion server to temporarily register the device information acquired by the acquisition unit. The print conversion server includes a reception unit configured to receive the request of temporarily registering the device information of the image forming apparatus from the requesting unit, and a registration unit configured to temporarily register the device information received by the reception unit. The portable device further includes a transmission unit configured to transmit to the print conversion server, information indicating use of the print conversion server at the image forming apparatus corresponding to the temporarily registered device information, and a transmission control unit configured to control the transmission unit not to transmit the information in response to disconnection of communication with the image forming apparatus. The print conversion server further includes a supply unit configured to supply, if the information transmitted from the transmission unit is received within a predetermined period of time, the print data to the image forming apparatus corresponding to the device information registered by the registration unit in response to an acquisition request of the print data, and a control unit configured to control, when the information transmitted from the transmission unit is not received within the predetermined period of time, the supply unit not to supply the print data to the image forming apparatus corresponding to the device information registered by the registration unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates a data structure of the print conversion server according to the first exemplary embodiment.

DESCRIPTION OF THE EMBODIMENTS

Various exemplary embodiments, features, and aspects of the invention will be described in detail below with reference to the drawings.

A first exemplary embodiment of the present invention is described with reference to the drawings.

Figure 1:
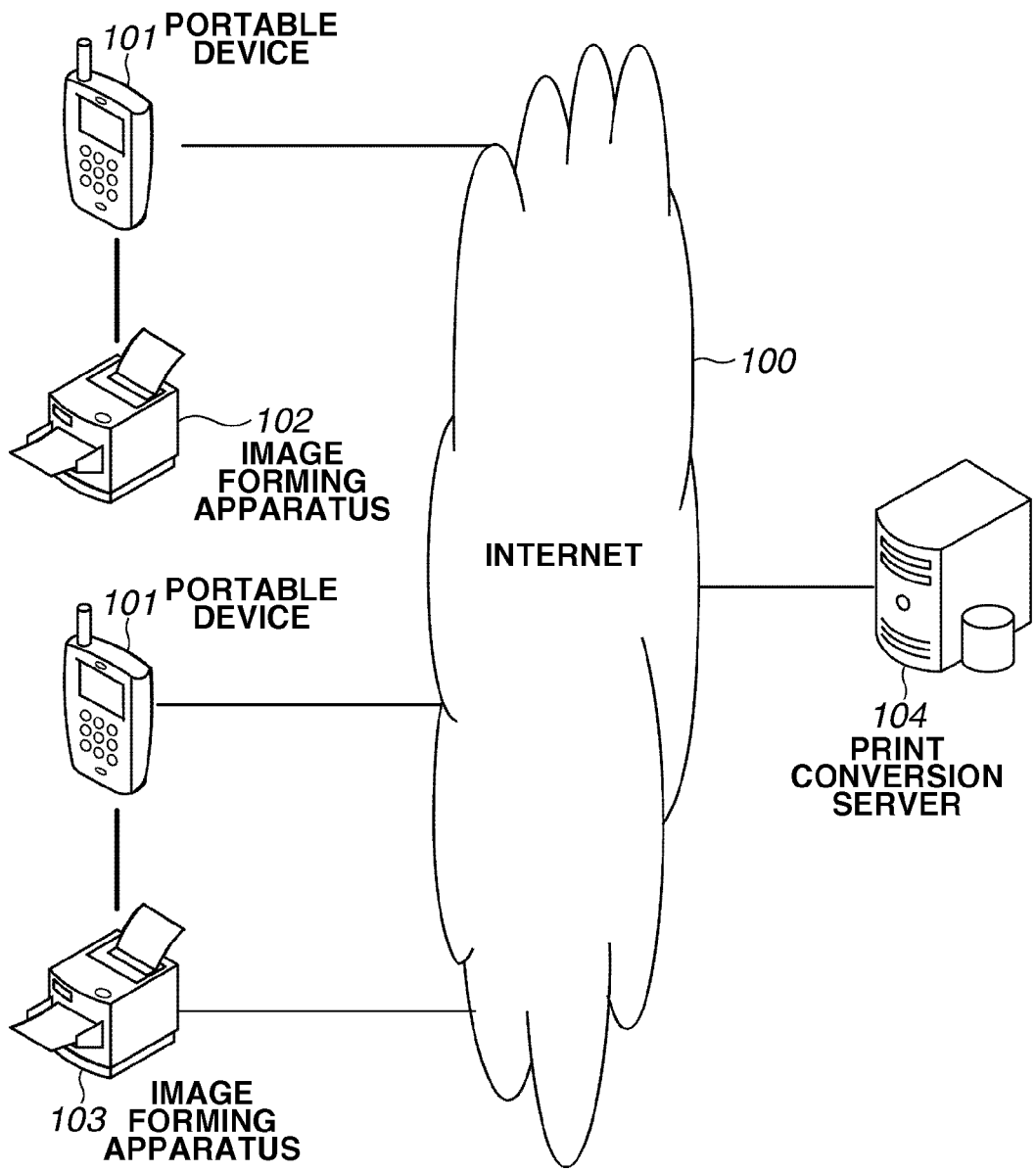
FIG. 1 illustrates a configuration of a printing system according to a first exemplary embodiment.

FIG. 1 illustrates a configuration of a printing system. A portable device 101 connectable to the Internet 100 is directly connected to image forming apparatuses 102 and 103. As a method for connecting the portable device 101 to the image forming apparatuses 102 and 103, for example, there is a connection method based on a universal serial bus (USB). However, the method is not limited to the USB connection as can be understood by those skilled in the art. For example, connection can be achieved via infrared ray communication, wireless communication, wireless fidelity (Wi-Fi) communication, wire communication, or a network. As an image forming apparatus, anyone of the image forming apparatuses 103 or 102 can be employed. In the present exemplary embodiment, image forming apparatus 102 is not connected to the Internet 100, while image forming apparatus 103 is connected to the Internet 100. A print conversion server 104 connected to the Internet can communicate with the portable device 101 and the image forming apparatus 103.

Figure 2:
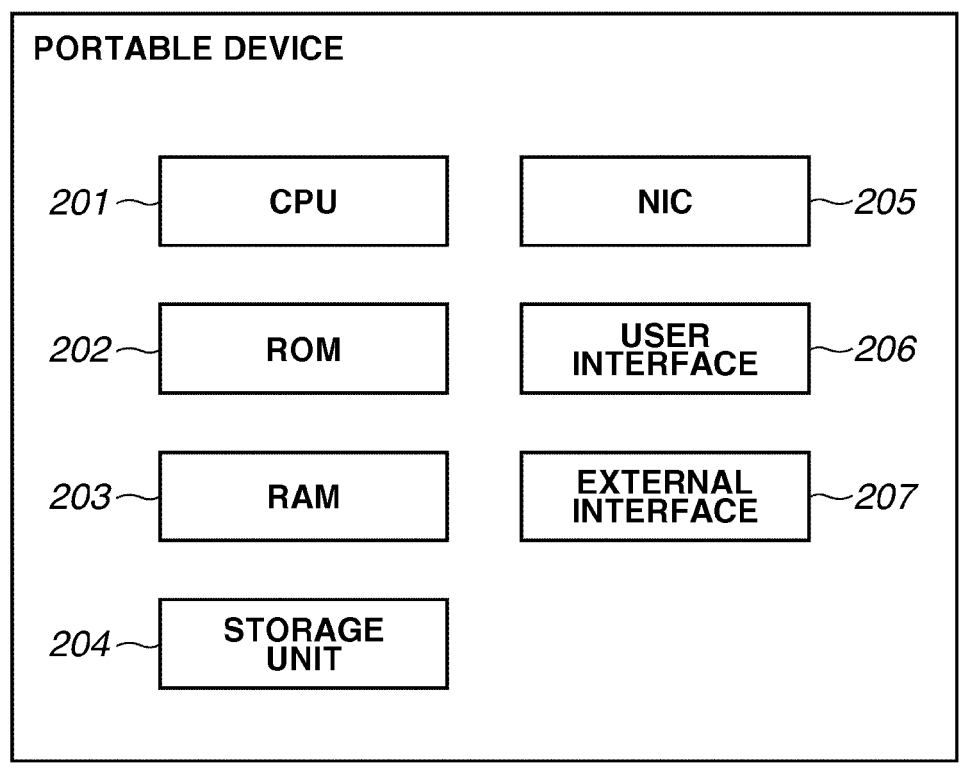
FIG. 2 illustrates a hardware configuration of a portable device according to the first exemplary embodiment.

Next, a hardware configuration of each device included in the printing system is described. FIG. 2 illustrates a hardware configuration of the portable device 101. In the present exemplary embodiment, the portable device 101 is a smartphone or a mobile phone that includes a central processing unit (CPU) 201 which executes various programs to achieve various functions. A read-only memory (ROM) 202 stores various programs. The portable device 101 also includes a random access memory (RAM) 203. The CPU 201 loads the programs stored in the ROM 202 to the RAM 203 to execute them. The RAM 203 is also used as a temporary work storage area of the CPU 201. A storage unit 204 is a hard disk drive (HDD) or a flash memory to store various data. A network interface card (NIC) 205 is a unit that connects the portable device 101 to a network or the Internet 100. A user interface 206 is a unit for receiving inputs from a user. An external interface 207 is a unit for direct connection, e.g. a USB interface to the image forming apparatuses 102 and 103. While the portable device 101 in the present exemplary embodiment is a smartphone/mobile phone, any portable device, such as a laptop computer, tablet computer, etc., is applicable.

Figure 3:
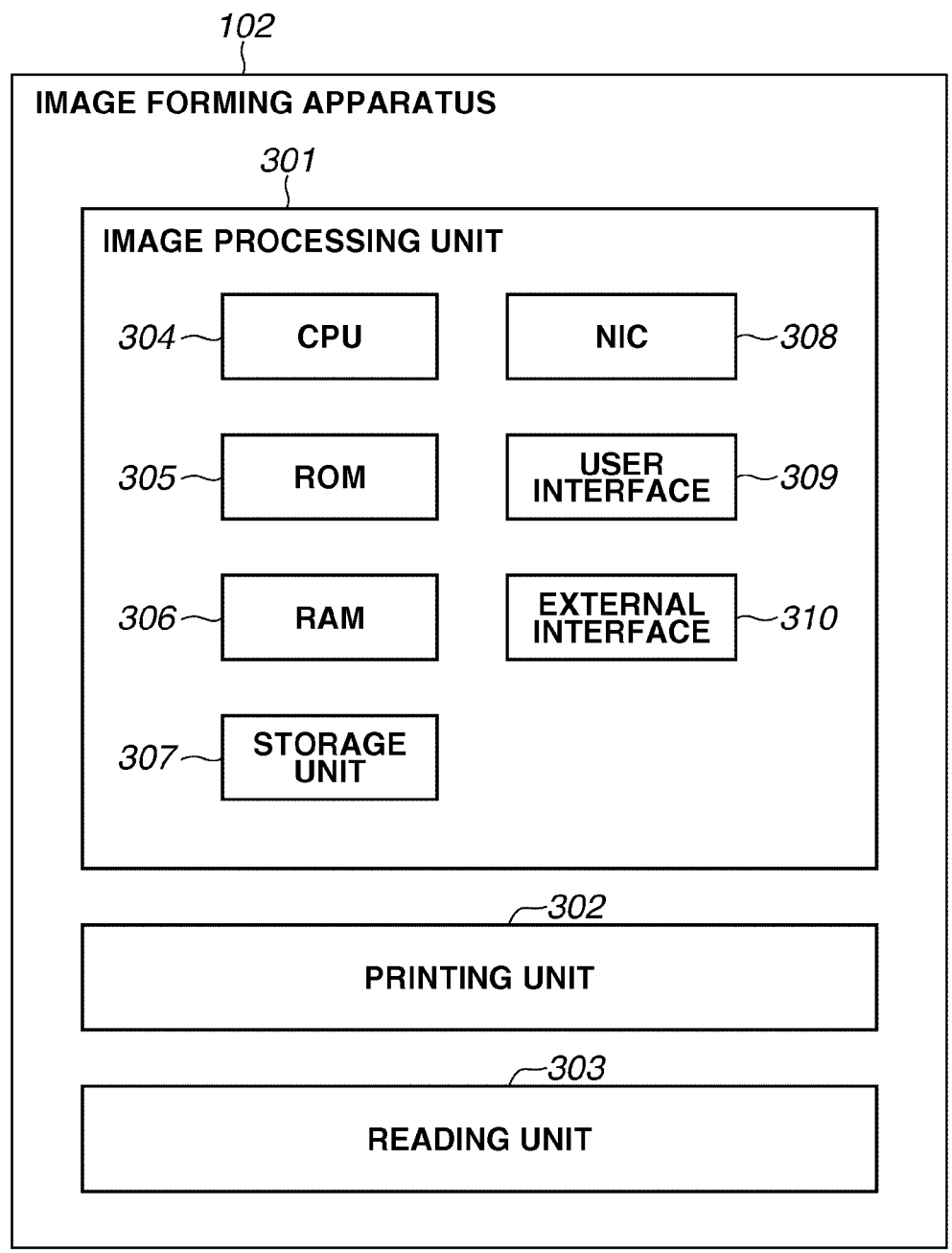
FIG. 3 illustrates a hardware configuration of an image forming apparatus according to the first exemplary embodiment.

FIG. 3 illustrates a hardware configuration of the image forming apparatus 102. The image forming apparatus 103 includes an image processing unit 301, a printing unit 302, and a reading unit 303. The image processing unit 301 includes a CPU 304, a ROM 305, a RAM 306, a storage unit 307, a NIC 308, a user interface 309, and an external interface 310.

The CPU 304 executes various programs to achieve various functions. The ROM 305 stores various programs. The CPU 304 loads the programs stored in the ROM 305 to the RAM 306 to execute them. The RAM 306 is also used as a temporary work storage area of the CPU 304. The storage unit 307 is a HDD or a flash memory to store various data. The NIC 308 is a unit that connects the image forming apparatus 103 to a network or the Internet 100. The user interface 309 is a unit for receiving inputs from a user. The external interface 310 is a unit for direct connection, e.g., a USB interface, to the portable device 101. The printing unit 302 executes printing based on print data. In the present exemplary embodiment, the configuration of the image forming apparatus 102 is similar to that of the image forming apparatus 103, except that it does not include the NIC 308. However, in another embodiment, the image forming apparatus 102 can include the NIC 307.

Figure 4:
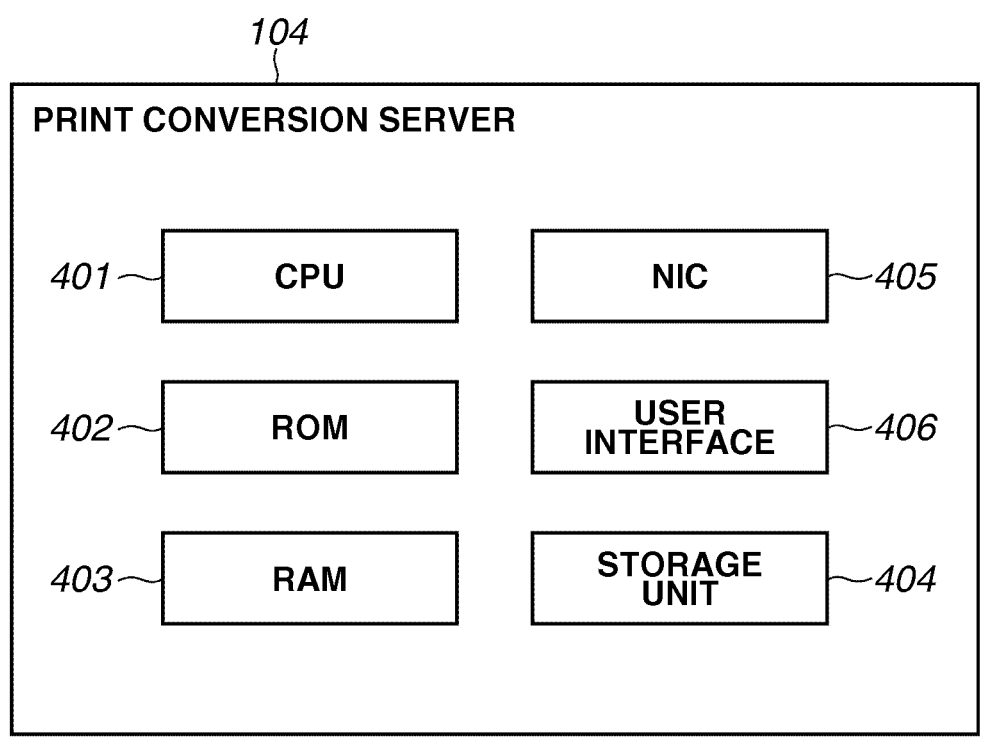
FIG. 4 illustrates a hardware configuration of a print conversion server according to the first exemplary embodiment.

FIG. 4 illustrates a hardware configuration of the print conversion server 104. A CPU 401 executes various programs to achieve various functions. A ROM 402 stores various programs. The print conversion server 104 also includes a RAM 403. The CPU 401 loads the programs stored in the ROM 402 to the RAM 403 to execute them. The RAM 403 is also used as a temporary work storage area of the CPU 401. A storage unit 404 is a HDD or a flash memory to store various data. A NIC 405 is a unit that connects the print conversion server 104 to the network or the Internet 100. A user interface 406 is a unit for receiving inputs from a user. In the present exemplary embodiment, the print conversion server 104 is a single server which includes the above-described elements. In another embodiment, the print conversion server 104 can be a combination of multiple servers, where the servers are separated based on functionality. For example, the storage unit 404 can be a server separate from, but connected to, the print conversion server 104.

Figure 5:
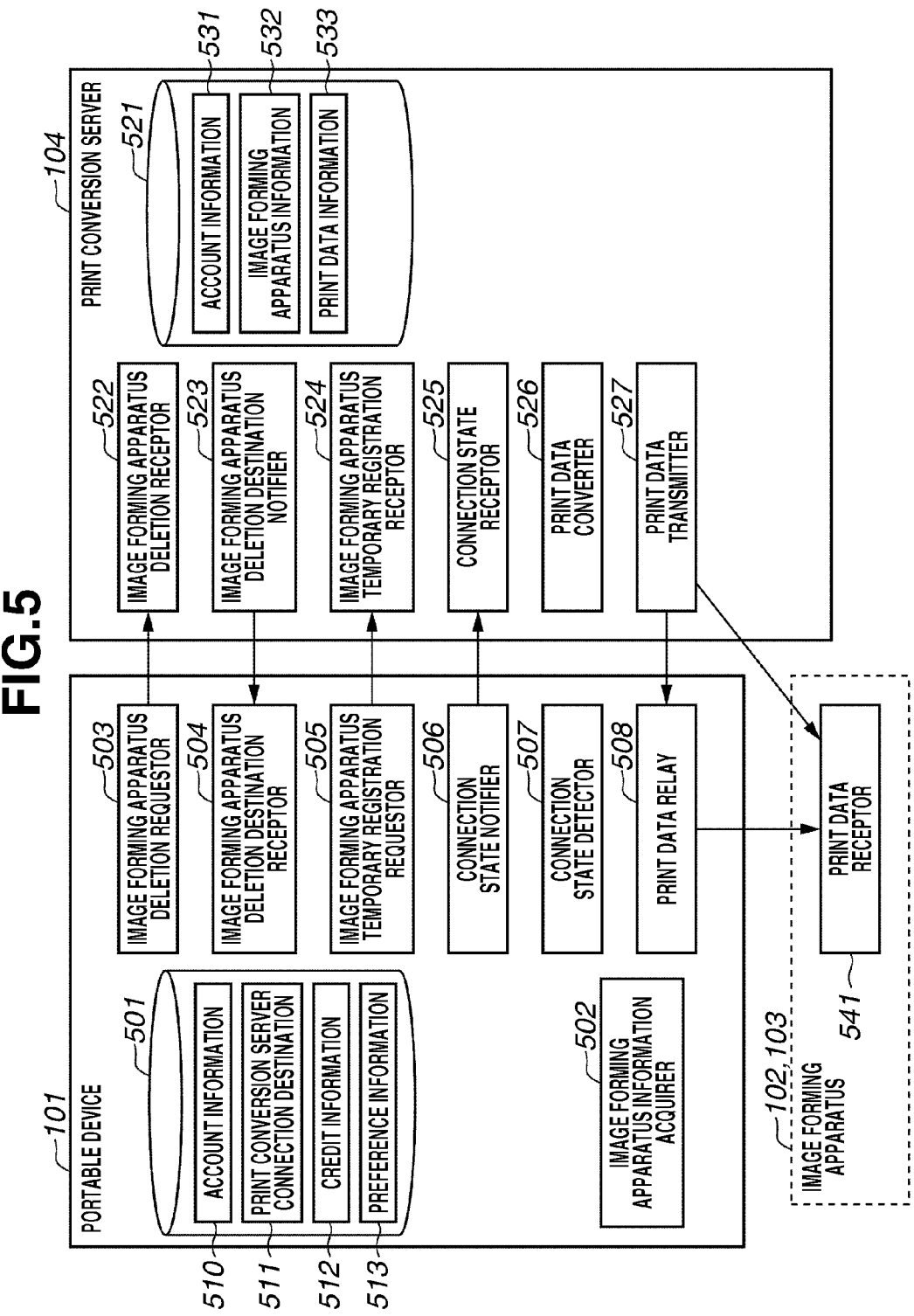
FIG. 5 illustrates a software configuration of each device included in the printing system according to the first exemplary embodiment.
Figure 6:
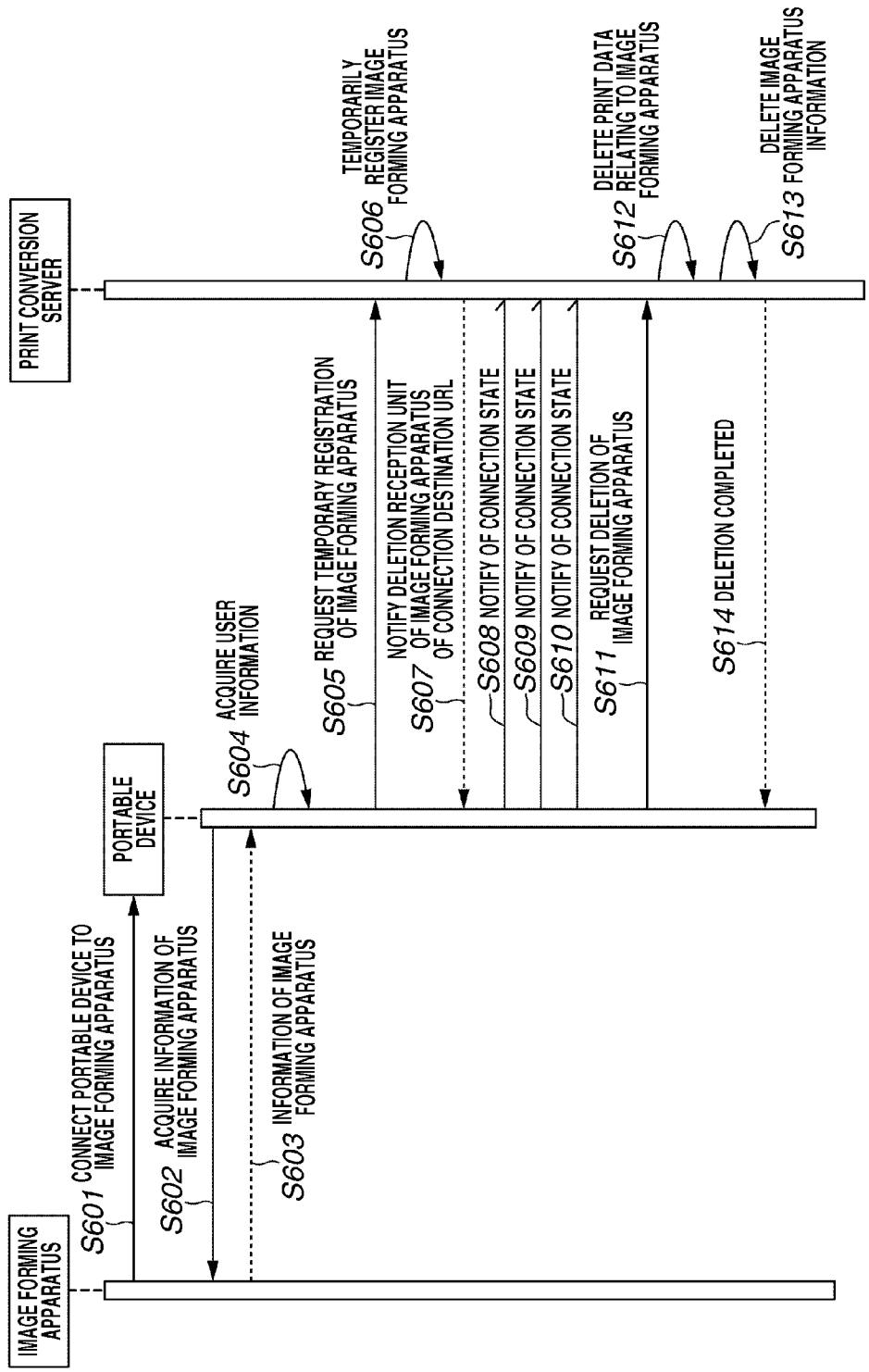
FIG. 6 illustrates a processing sequence according to the first exemplary embodiment.

FIG. 5 illustrates a software configuration of each device included in the printing system. Programs to achieve software functions illustrated in FIG. 5 are stored in the ROMs 202, 305, and 402 of the devices. The CPUs 201, 304, and 401 load and execute the programs to the RAMs 203, 306, and 403 to execute them, thereby achieving the functions. Units 501 and 521 correspond to the storage units 204 and 404 of the devices. FIG. 6 illustrates a sequence of temporarily registering the image forming apparatuses 102 and 103 in the print conversion server 104 to utilize print conversion services in the printing system, and deleting the image forming apparatuses 102 and 103 from the print conversion server 104 after an end of temporary use.

Referring to FIGS. 5 and 6, the function of each device is described. In step S601, when the portable device 101 is connected to the image forming apparatuses 102 and 103 via the external interface 207, the portable device 101 starts temporary registration of the image forming apparatuses 102 and 103. This can be accomplished via any known method, such as plug and play. In steps S602 and S603, an image forming apparatus information acquirer 502 of the portable device 101 acquires information of the image forming apparatuses 102 and 103 that will be used to print data supplied from the print conversion server 104. The information to be acquired (hereinafter referred to as device information) includes device unique information such as a product name, a network address or a media access control (Mac) address, capability information such as whether color print, two-sided printing or print data can be directly received from the print conversion server 104, and other setting information. The setting information may include information as to whether registration in external services is possible as described below with respect to FIG. 7. As can be understood by those skilled in the art, the information to be acquired is not limited to the above-described items.

In step S604, the portable device 101 acquires the following information from the storage unit 501: account information 510 for utilizing print conversion services, which is typically information relating to the owner of the portable device 101; print conversion server connection destination information 511, which is a uniform resource locator (URL) of a destination for requesting various processes, such as an image forming apparatus temporary registration receptor 524 of the print conversion server 104; credit information 512, which is typically credit information of the portable device's 101 owner, and which is used for charging printing expenses in the case of temporary use; and preference information 513, which typically includes print settings frequently used by portable device's 101 owner. As can be understood by those skilled in the art, the type of information stored in the storage unit 501 is not limited to the above-described information.

In step S605, the portable device 101 requests, via an image forming apparatus temporary registration requestor 505, the image forming apparatus temporary registration receptor 524 of the print conversion server 104 to temporarily register the image forming apparatus. This request is done via a temporary registration screen as described below with respect to FIG. 7. During the temporary registration, the portable device 101 transmits the account information 510 and the device information acquired in step S602, and requests temporary registration of these pieces of information. The portable device 101 can also transmit the print setting information generated from the preference information 513, and the credit information 512 for charging printing expenses.

In step S606, the print conversion server 104 associates the device information of at least one of the image forming apparatuses 102 and 103 with the received account information 510 to store them in the storage unit 521, and registers the particular image forming apparatus that will be used temporarily. In step S607, in response to the temporary registration, an image forming apparatus deletion destination notifier 523 provides an image forming apparatus deletion destination receptor 504 of the portable device 101 with a connection destination URL of an image forming apparatus deletion receptor 522. In the first exemplary embodiment, in step S607, the connection destination URL of the image forming apparatus deletion receptor 522 is transmitted to the portable device 101. However, connection destination information can be stored beforehand as a print conversion server connection destination 511 in the storage unit 501 of the portable device 101. Thus, the image forming apparatuses 102 and 103 are temporarily registered in the print conversion server 104, and print data acquisition is requested via a printer selection screen as described below with respect to FIG. 8, and then the image forming apparatuses 102 and 103 can perform printing.

During the printing, the print conversion server 104 determines whether the image forming apparatuses 102 and 103 can directly receive the print data based on the capability information of the image forming apparatus received in step S605. When it is determined that the print data is receivable, the print conversion server 104 transmits the print data from a print data transmitter 527 to a print data receptor 541. When the image forming apparatus cannot directly receive the print data because, for example, it cannot be connected to the Internet, the print conversion server 104 transmits the print data from the print data transmitter 527 to the print data receptor 541 via a print data relay 508 of the portable device 101. The print data to be transmitted is print data converted by a print data converter 526 based on document data to be printed according to an instruction. As described above, the image forming apparatuses 102 and 103 are temporarily stored by using the account information stored in the portable device 101. This enables easy registration in the print conversion server 104 without imposing any time and labor on the owners of the image forming apparatuses 102 and 103. Even when the image forming apparatus 102 cannot be connected to the Internet 100, as in the case of a personal printer, the image forming apparatus is registered in the print conversion server 104, print data is supplied from the print conversion server 104, and printing can be performed based on the supplied print data.

In steps S608 to S610, the portable device 101 performs the following processing when a connection state detector 507 recognizes that the image forming apparatuses 102 and 103 are connected. In this processing, information indicating that the temporarily registered image forming apparatus is being connected with the print conversion server 104, is transmitted at a fixed interval. Specifically, a connection state notifier 506 of the portable device 101 provides a connection state of the image forming apparatus about which the device information is temporarily registered to a connection state receptor 525 of the print conversion server 104 via a polling mechanism. The connection state notifier 506 transmits information uniquely identifying the image forming apparatus registered in the storage unit 521 of the print conversion server 104. In the first exemplary embodiment, the transmitted information includes a Mac address of the image forming apparatus. However, any information can be used to uniquely identify the image forming apparatus. In the first exemplary embodiment, the portable device 101 notifies the print conversion server 104 of the connection state. However, the print conversion unit 104 may transmit a checking signal of the connection state to the portable device 101 at a fixed interval.

When the user instructs releasing of the registration of the image forming apparatuses 102 and 103, in step S611, an image forming apparatus deletion requestor 503 requests the image forming apparatus deletion receptor 522 to delete image forming apparatus information 532. In step S612, the print conversion server 104 deletes print data information 533 regarding the imager forming apparatus to be deleted according to the request. In step S613, the print conversion server 104 deletes the image forming apparatus information 532 from the storage unit 521. As described below with respect to FIG. 12, as to the temporarily registered image forming apparatus, the print conversion server 104 deletes the image forming apparatus information 532 from the storage unit 521 when the notification of the connection state transmitted at the fixed interval in steps S608 to S610 cannot be received within a predetermined period. Thus, when a user's temporary utilization has ended and communication of the portable device 101 with the image forming apparatuses 102 and 103 is disconnected, all the information regarding the image forming apparatus registered for temporary use of the print conversion server 104 can be deleted. This disables printing at the image forming apparatus corresponding to the device information registered for temporary use. The disconnection in this case can occur when data communication of a program activated at the portable device 101 does not end normally, i.e., is forced. For example, the portable device 101 is forcibly removed from one of the image forming apparatus 102 and 103, thus disconnecting the data communication.

Figure 7:
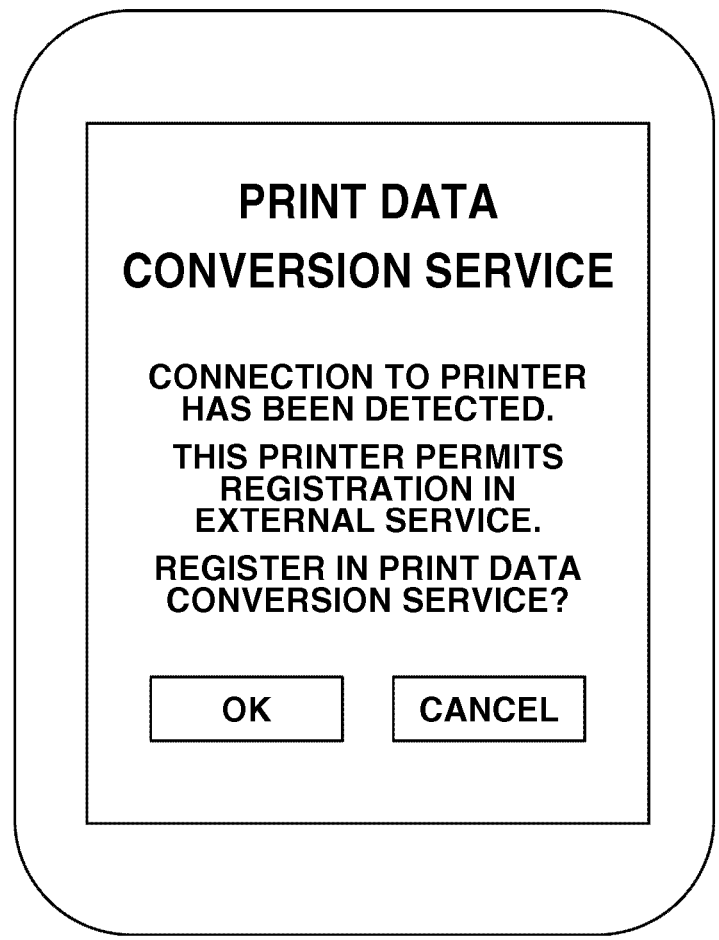
FIG. 7 illustrates a temporary registration screen of the image forming apparatus according to the first exemplary embodiment.

FIG. 7 illustrates an example of a temporary registration screen of the image forming apparatus displayed on the user interface 206 of the portable device 101 before step S605. The temporary registration of step S605 is executed by pressing an OK button. In the present exemplary embodiment, the setting information of the image forming apparatuses 102 and 103 contains information about permission of registration in external services, and a display content is changed according to a result of the information acquisition of the image forming apparatus of step S602. In the present exemplary embodiment, there are four types of registration permission in external services:

A) external connection is permitted;
B) external connection is permitted, where the administrator registered in the image forming apparatus is notified at the time of connection;
C) external connection is permitted, but a user must be authenticated at the image forming apparatus at the time of connection; and
D) external connection is inhibited.

In "B", the external connection is permitted, but the administrator registered in the image forming apparatus is notified of the connection. This results in a higher security level that what is provided for in "A". In "C", the user is authenticated at the image forming apparatuses 102 and 103 within a certain period of time after the OK button is pressed, thereby enabling external connection. For example, for temporary use of an image forming apparatus at a location where a user is visiting, the user must obtain approval from someone associated with the location before using the image forming apparatus. This increases the security level even more. While the present exemplary embodiment is described with respect to the above-listed setting types, any setting that would enable practice of the present exemplary embodiment is applicable.

As described, based on the registration permission information in the external services, with respect to the image forming apparatus that should not be connected to the external services, certain connection conditions can be set or connection can be inhibited. However, the registration permission information in the external services may not always be needed. When the setting information of the image forming apparatuses 102 and 103 contains no setting for connecting to the external services, the information forming apparatuses may be registered in the print conversion server 104 without the setting information. Conversely, when the setting information of the image forming apparatuses 102 and 103 contains no setting for connecting to the external services, registration of the information forming apparatuses in the print conversion server 104 may be inhibited.

Figure 8:
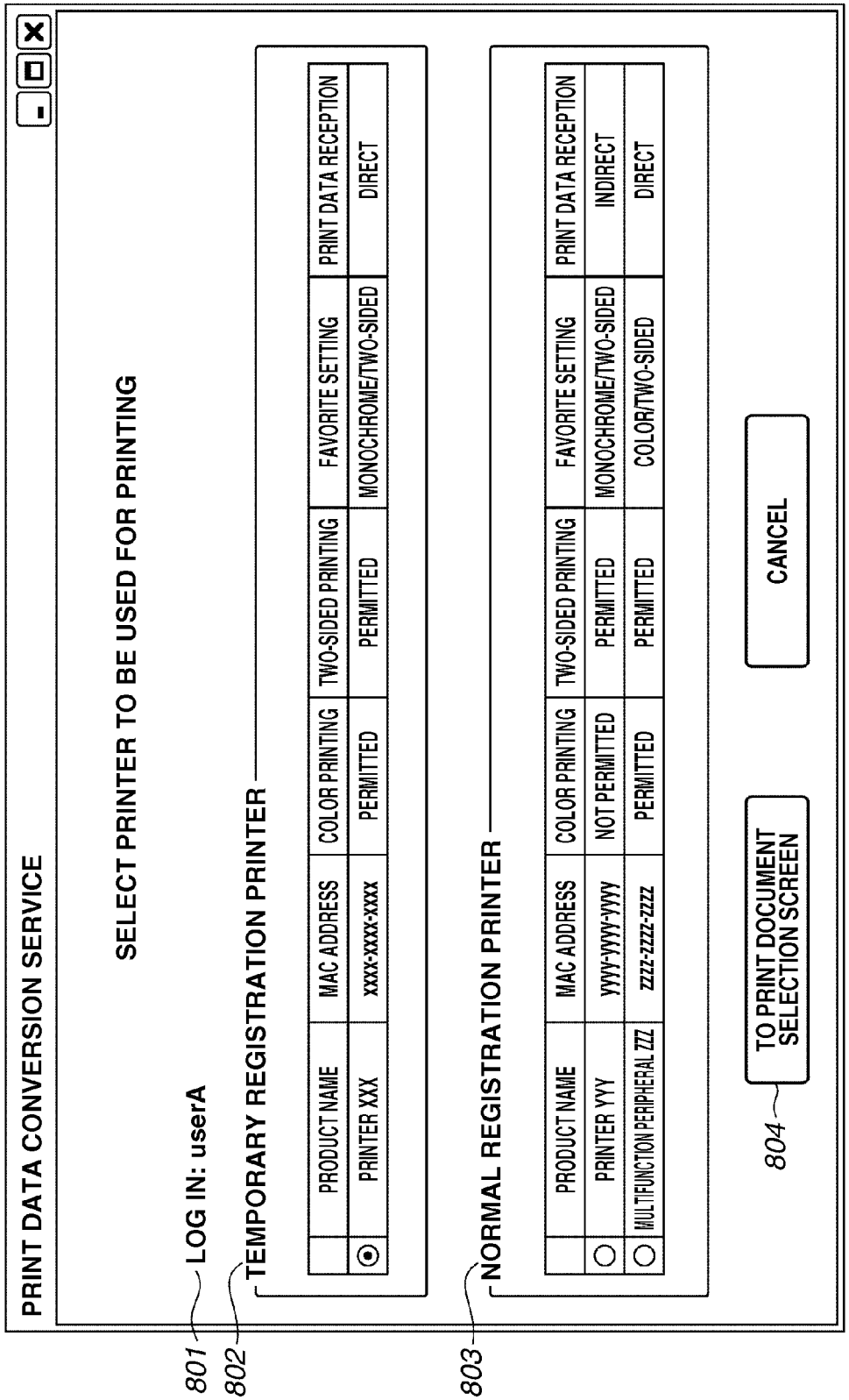
FIG. 8 illustrates a printer selection screen of the print conversion server according to the first exemplary embodiment.

FIG. 8 illustrates an example of a printer selection screen of the print conversion server 104. When the user accesses the print conversion server 104 from the portable device 101 or an information terminal device (not illustrated) in a state where the information forming apparatuses 102 and 103 are registered in the print conversion server 104, the printer selection screen is displayed on the user interface of the portable device 101 or the information terminal device (not illustrated). The printer selection screen is displayed after the user is authenticated based on the account information registered in the user authentication screen (not shown) of the print conversion service. As described below, this screen is generated based on a plurality of data illustrated in FIG. 9.

An account information display 801 displays the account information authenticated on the user authentication screen. A temporary registration printer display 802 displays the temporarily registered image forming apparatus in association with the account information displayed on the account information display unit 801. In the first exemplary embodiment, the device unique information (product name or Mac address) and the capability information (color printing, two-sided printing or print data reception) of the image forming apparatus received at the time of request for the temporary registration in step S605 is displayed. In addition, the print setting information generated from the preference information 513 during the temporary registration is displayed. The displayed device information is not limited to the above-described information, and any information that would enable practice of the present exemplary embodiment is applicable.

A normal registration printer display 803 displays a normally registered image forming apparatus in association with the account information displayed in the account information display 801. Though not described in detail in the present exemplary embodiment, the normally registered image forming apparatus differs from the temporarily registered image forming apparatus in that it is an image forming apparatus registered for normal, not temporary, use by a user. Registering an image forming apparatus for normal use does not need to be done via the portable device 101. The image forming apparatus information does not need to be deleted after an end of use, and hence the print conversion server 104 deletes the image forming apparatus information only when deletion of the image forming apparatus is requested. Further, when a notification of a connection state transmitted at a fixed interval is not received within a predetermined period, the print conversion server 104 does not delete the image forming apparatus information. A print document selection button 804 is used to change to a screen (not illustrated) for selecting a print target document. The user selects the image forming apparatus to execute printing from the temporarily registered printer display 802 or the normal registration printer display 803 and presses the print document selection button 804.

FIG. 9 illustrates an example of a data structure of the user information 531, the image forming apparatus information 532, and the print data information 533 stored in the storage unit 521 of the print conversion server 104. In the present exemplary embodiment, the illustrated data structure is based on a key value store (KVS) database. However, a relational database (RDB) data structure can also be used. An account 901 is account information necessary for using the print conversion server 104. Specifically, the account 901 is the account information 510 stored in the storage unit 501 of the portable device 101 to be used in the temporary registration of the image forming apparatus, or the account information displayed on the account information display 801. Credit information 902 is used for charging printing expenses to the account information, and stored when credit information is designated during temporary registration. A Mac address 903 is data used for uniquely identifying the image forming apparatus.

A print data transmission destination 904 is data indicating when the image forming apparatus can directly receive the print data. A registration form 905 is data indicating whether a registration of the image forming apparatus is temporary registration or normal registration. Color printing 906 and two-sided printing 907 both indicate capability of the image forming apparatus. Print data 908 is information to identify print data currently processed by the print conversion server 104. A processing state 909 is data indicating a processing state of the print data at the print conversion server 104. In the first exemplary embodiment, the account information 531 of the items 901 and 902, the image forming apparatus information 532 of the items 903 to 907, and the print data information of the items 908 and 909 are associated with each other when stored. In an example illustrated in FIG. 9, for an account of UserA, an image forming apparatus having a Mac address of xxxx-xxxx-xxxx is temporarily stored. Other image forming apparatuses having Mac addresses of yyyy-yyyy-yyyy and zzzz-zzzz-zzzz are normally registered. FIG. 9 shows that processing of two print data of xxxx pdf and yyyy pdf are in progress for the image forming apparatus of the Mac address xxxx-xxxx-xxxx. The data structure diagram of the print conversion server 104 is not limited to these items and components.

Figure 10:
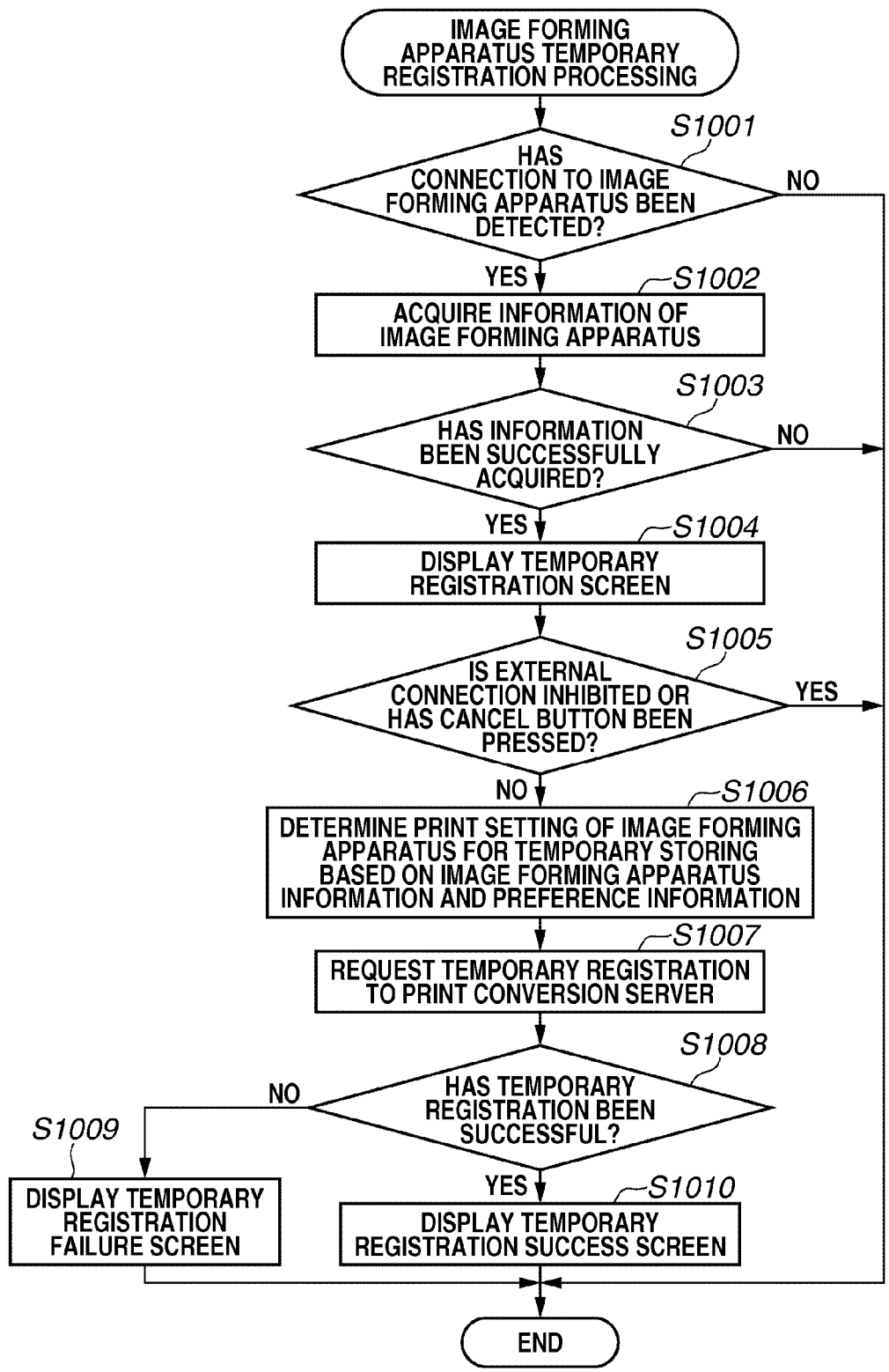
FIG. 10 is a flowchart illustrating processing of the portable device during temporary registration of the image forming apparatus according to the first exemplary embodiment.

FIG. 10 is a flowchart illustrating processing of the portable device 101 when the image forming apparatuses 102 and 103 are temporarily registered in the print conversion server 104. The processing is achieved when each program is executed by the CPU 201 of the portable device 101 with the software configuration of the portable device 101 illustrated in FIG. 5. First, in step S1001, when the portable device 101 is connected to the image forming apparatuses 102 and 103 via the external interface 207, the connection state detector 507 of the portable device 101 detects the connection. This step is started in response to a start of the program of the portable device to select an image forming apparatus that executes printing. In step S1002, the connection state detector 507 of the portable device 101 instructs the image forming apparatus information acquirer 502 to acquire image forming apparatus information, namely, device information. When acquisition of the image forming apparatus information is successful (YES in step 1003), in step S1004, the portable device 101 displays the temporary registration screen of the image forming apparatus illustrated in FIG. 7 on the user interface 206. In this case, when the image forming apparatus information inhibits connection to the external services ((YES in step S1005), the portable device 101 displays a message indicating the inhibition of external connection on the temporary registration screen illustrated in FIG. 7 to end the temporary registration.

In step S1006, the user instructs temporary registration from the temporary registration screen of the image forming apparatus illustrated in FIG. 7. In step S1006, the portable device 101 determines print setting of the image forming apparatus to be temporarily registered based on acquired capability information of the image forming apparatus and the preference information 513 in the storage unit 501. In step S1007, the portable device 101 requests the print conversion server 104 to temporarily register the image forming apparatus, from the image forming apparatus temporary registration requestor 505 together with the information described above in step S605. In step S1008, the portable device 101 determines whether the temporary registration is in error. When notified of a temporary registration error from the print conversion server 104, in step S1009, the portable device 101 displays a temporary registration failure screen (not illustrated) on the user interface 206. In this case, the portable device 101 can display an error reason, such as illegal account information, in response to the error from the print conversion server 104.

When notified of a temporary registration success from the print conversion server 104, in step S1010, the portable device 101 displays a temporary registration completion screen (not illustrated) on the user interface 206. In this state, when the portable device 101 or the information terminal device (not illustrated) access the print conversion server 104, the printer selection screen illustrated in FIG. 8 is displayed on the user interface of the portable device 101 or the information terminal device (not illustrated). As described above with respect to FIG. 8, this enables the user to instruct printing by selecting the image forming apparatus. While the temporary registration completion screen is displayed in step S1010, the printer selection screen illustrated in FIG. 8 can also be displayed. The temporary registration process in FIG. 10 ends when the information acquisition of the image forming apparatus fails in step S1003. In another embodiment, if the information acquisition fails in step S1003, a user is provided an option to manually input information of the image forming apparatus on an information input screen of the image forming apparatus (not illustrated), and then the processing may proceed to step S1004.

Figure 11:
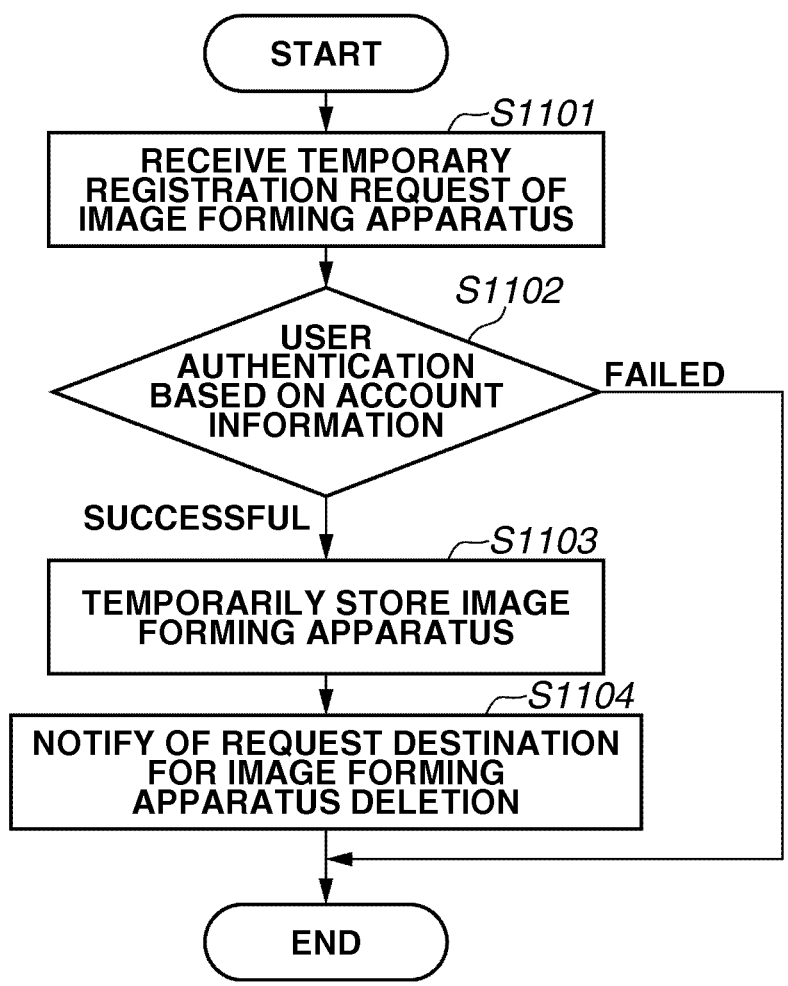
FIG. 11 is a flowchart illustrating processing in the print conversion server during the temporary registration of the image forming apparatus according to the first exemplary embodiment.

FIG. 11 is a flowchart illustrating processing of the print conversion server 104 when the image forming apparatuses 102 and 103 are temporarily registered in the print conversion server 104. The processing is achieved when each program is executed by the CPU 401 of the print conversion server 104 with the software configuration of the print conversion server illustrated in FIG. 5. In step S1101, the print conversion server 104 receives a temporary registration request of the image forming apparatus from the image forming apparatus temporary registration receptor 524. In step S1102, the print conversion server 104 authenticates the user based on the received account information. When it is determined that the print conversion server 104 has failed in user authentication (NO in step S1102), the processing returns an error and ends.

When it is determined that the authentication is successful (YES in step S1102), in step S1103, the image forming apparatus information is registered in the storage unit 521 as described above in step S606. In step S1104, the image forming apparatus deletion notifier 523 notifies a connection URL of the image forming apparatus deletion receptor 522 as described above in step S607. This is the temporary registration of the device information of the image forming apparatus executed in response to the registration request for the temporary use of the image forming apparatus made by the portable device.

Figure 12:
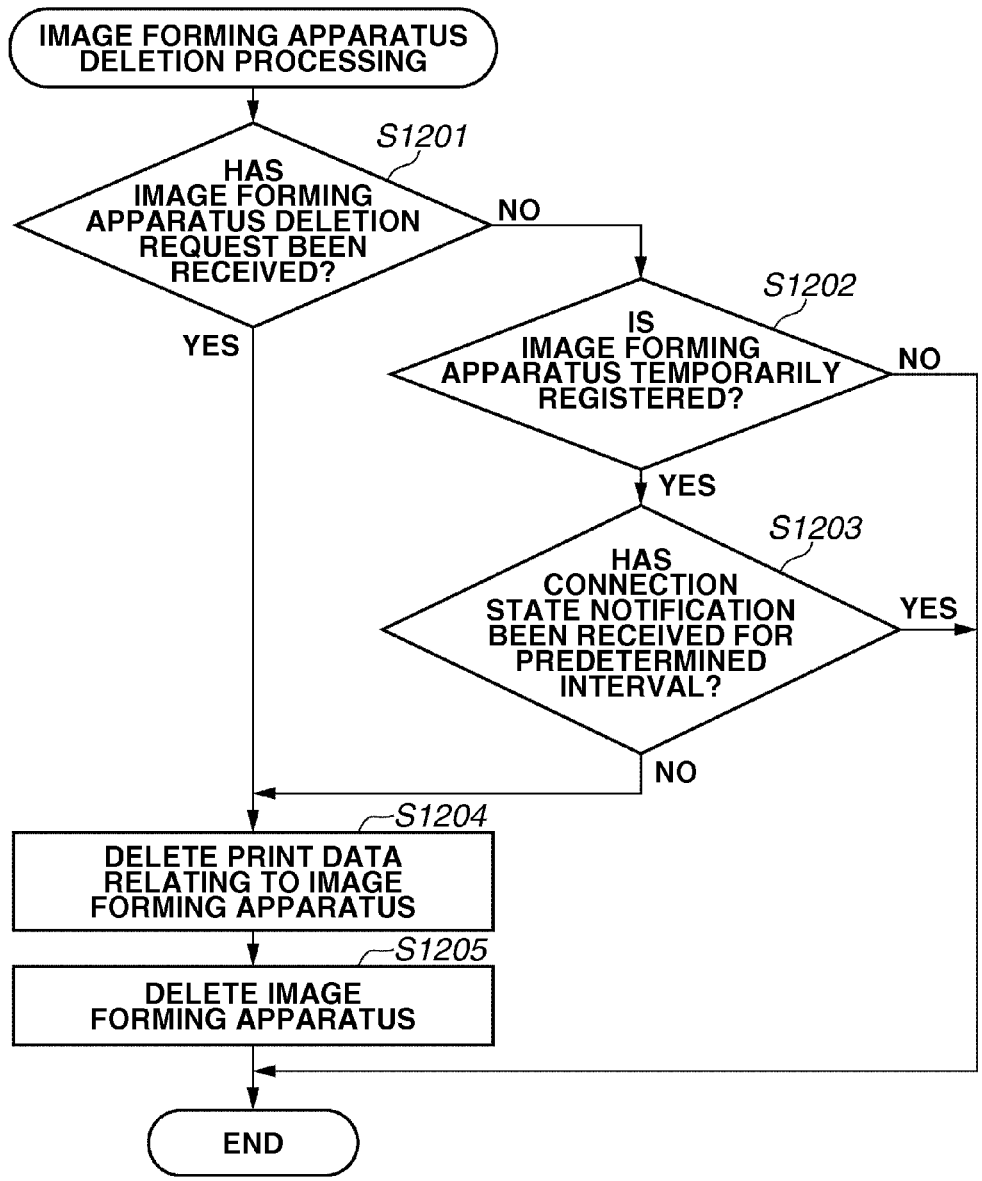
FIG. 12 is a flowchart illustrating processing in the print conversion server during deletion of the image forming apparatus according to the first exemplary embodiment.

FIG. 12 is a flowchart illustrating processing of the print conversion server 104 when the image forming apparatuses 102 and 103 are deleted from the print conversion server 104. The processing is achieved when each program is executed by the CPU 401 of the print conversion server 104 with the software configuration of the portable device 101 illustrated in FIG. 5. In step S1201, a check is made whether the print conversion server 104 receives a deletion request from the image forming apparatus deletion receptor 522. If a request is received, then, in step S1204, the print conversion server 104 deletes print data relating to the image forming apparatus to be deleted according to the request from the storage unit 521. In step S1205, the print conversion server 104 deletes the image forming apparatus from the storage unit 521. For example, in the example illustrated in FIG. 9, upon receipt of a deletion request of the image forming apparatus having the Mac address of xxxx-xxxx-xxxx, the print conversion server 104 cancels processing of print data of xxxx pdf and yyyy pdf, and deletes the data having the Mac address of xxxx-xxxx-xxxx.

If it is determined that no deletion request of the image forming apparatus has been received (NO in step S1201), in the case where the image forming apparatus is temporarily registered (YES in step S1202), in step S1203, the print conversion server 104 periodically checks a connection state notification (S608 to S610). When it is determined that no connection state notification has been received from the temporarily registered image forming apparatus for at least a predetermined period (NO in step S1203), the connection between the portable device 101 and the image forming apparatus is cancelled, and the print conversion server 104 determines that the temporary use has ended. In other words, the print conversion server 104 performs control to hold the device information while information transmitted at a fixed interval can be received within a predetermined period of time, and to delete the device information when the reception unit does not receive the information transmitted at the fixed interval within the predetermined period of time. Thus, even in the abovementioned case, in step S1204 and S1205, the print conversion server 104 deletes information regarding the temporarily used image forming apparatus from the storage unit. As a result, no print data is supplied to the image forming apparatus corresponding to the deleted device information.

According to the first exemplary embodiment, the image forming apparatuses 102 and 103 are temporarily registered by using the account information stored in the portable device 101. Hence, the image forming apparatuses 102 and 103 can be easily registered in the print conversion server 104 without imposing any time and labor on the owners of the image forming apparatuses 102 and 103. As another effect of the present embodiment, even when no connection notification has been received from the portable device 101 for the predetermined period, the print conversion server 104 can appropriately delete the image forming apparatus which has ended temporary use by deleting information regarding the image forming apparatus.

A second exemplary embodiment will now be described. In the first exemplary embodiment, after the end of the temporary use, all the pieces of image forming apparatus information can be deleted. However, when the portable device 101 is disconnected from the image forming apparatuses 102 and 103, the information regarding the image forming apparatus should be deleted from the print conversion server 104 as soon as possible. In the first exemplary embodiment, there is a time lag between disconnecting the portable device 101 from the image forming apparatuses 102 and 103 and the print conversion server 104 deleting the information regarding the image forming apparatus.

Due to this time lag, it is possible that even after the end of the temporary use, processing of the image forming apparatus will continue. As an example, referring to FIG. 9, the data having the Mac address of xxxx-xxxx-xxxx is described. Even when the user is not in front of the image forming apparatus after the end of the temporary use, transmission or conversion of xxxx.pdf continues until it is determined that the print conversion server 104 receives no connection notification. This can result in illegal use of the image forming apparatus.

Figure 13:
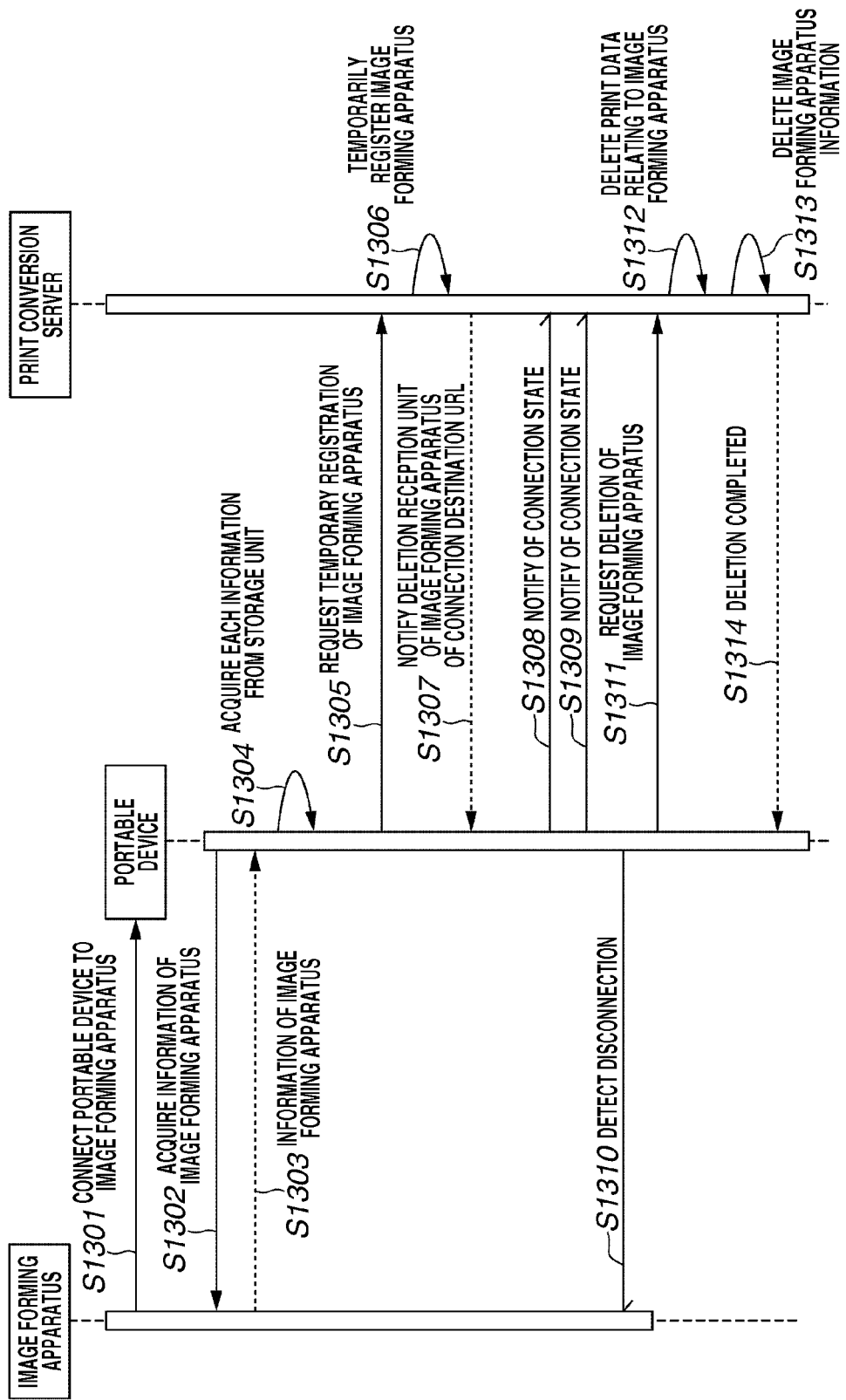
FIG. 13 illustrates a processing sequence according to a second exemplary embodiment.

The second exemplary embodiment is similar to the first exemplary embodiment in the configuration of the printing system illustrated in FIG. 1, the hardware configuration illustrated in FIGS. 2 to 4, and the software configuration illustrated in FIG. 5. FIG. 13 illustrates a sequence of processing where an image forming apparatus is temporarily registered in the print conversion server 104 and deleted from a print conversion server 104 after an end of the temporary use according to the second exemplary embodiment. Steps S1301 to S1309 in FIG. 13 are similar to steps S601 to S610 illustrated in FIG. 6, and thus, a detailed description is omitted herein.

In step S1310, a connection state detector 507 detects disconnection of the portable device 101 from the image forming apparatuses 102 and 103. In step S1311, an image forming apparatus deletion requestor 503 makes a deletion request upon the disconnection to an image forming apparatus deletion receptor 522 of the print conversion server 104. In the case of the first exemplary embodiment, when the information transmitted at the fixed interval is not received within the predetermined period after the connection state is notified in step S609, the print conversion server 104 determines that the portable device 101 has been disconnected and deletes the device information. However, according to the second exemplary embodiment, since the deletion request is provided by the portable device 101 upon the disconnection, the print conversion server 104 can quickly delete relevant information regarding the image forming apparatus.

A third exemplary embodiment is directed to a printing system that includes no CPU 201 in a hardware configuration of a portable device 101 as compared with the first exemplary embodiment illustrated in FIG. 2. For example, the portable device 101 is achieved by a USB dongle. In other words, the present invention can be achieved as long as the portable device 101 has portability. After connected to image forming apparatuses 102 and 103, the portable device 101 loads, by using a CPU 304 of each of the image forming apparatuses 102 and 103, a program stored in a ROM 202 to a RAM 203 to execute it. In the second exemplary embodiment, after the disconnection from the image forming apparatuses 102 and 103 is detected, the portable device 101 transmits the deletion request of the image forming apparatus. According to the third exemplary embodiment, the portable device 101 executes the program by using the CPU 304 of each of the image forming apparatuses 102 and 103. Thus, the third embodiment differs from the second exemplary embodiment in that a program, such as requesting deletion of the image forming apparatus, is not executed after disconnection from the image forming apparatuses 102 and 103.

Figure 14:
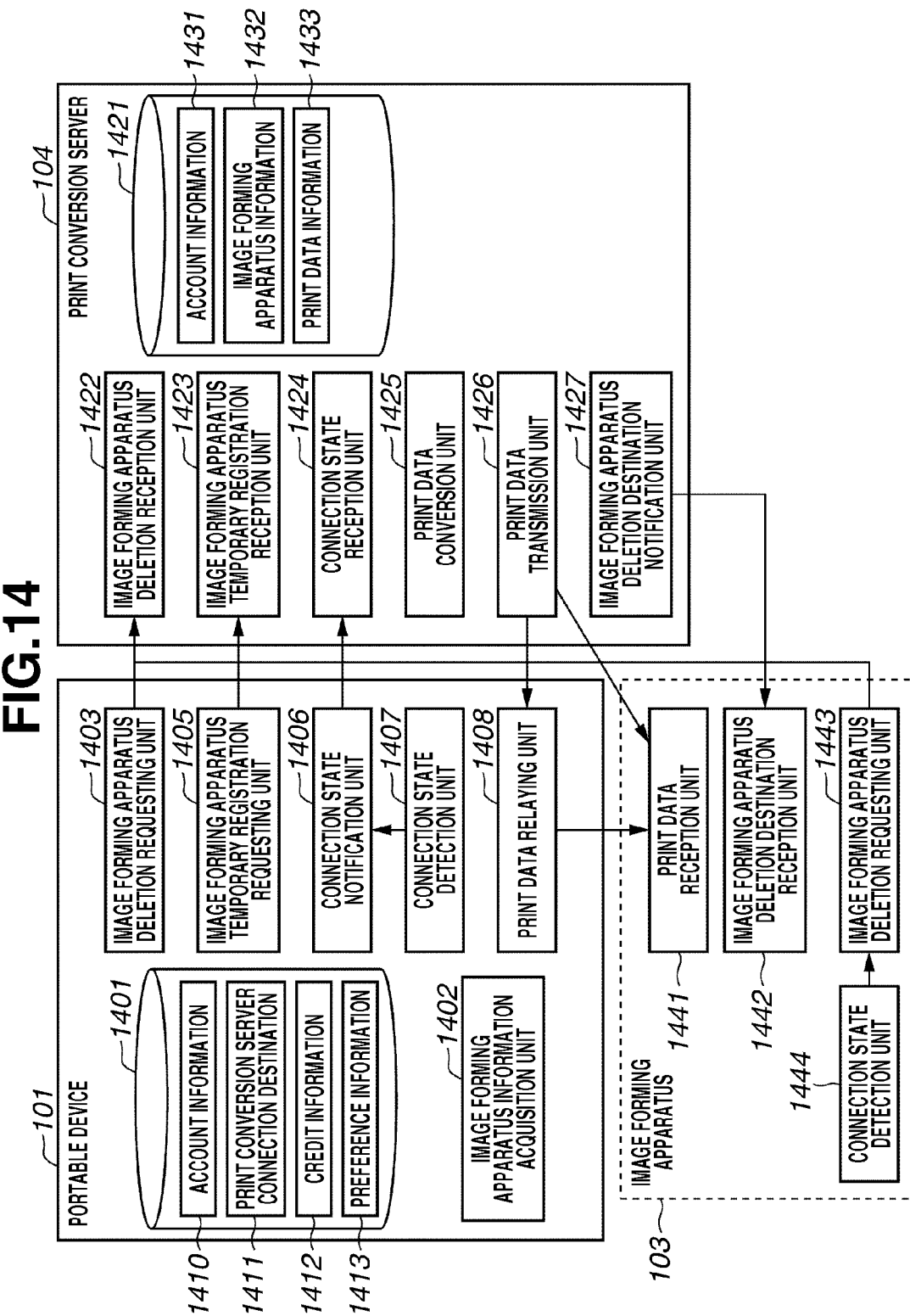
FIG. 14 illustrates a software configuration of each device included in a printing system according to a third exemplary embodiment.

FIG. 14 illustrates a software configuration of each device included in the printing system according to the third exemplary embodiment. As compared with the software configuration of the first exemplary embodiment illustrated in FIG. 5, each of the image forming apparatuses 102 and 103 includes an image forming apparatus deletion destination reception unit 1442, an image forming apparatus deletion requesting unit 1443, and a connection state detection unit 1444. References numbers 1401-1403, 1405-1408, 1410-1413, 1421-1427, and 1431-4133 are equivalent to reference numbers 501-503, 505-508, 510-513, 521-527, and 531-533. As such, a detailed description of these reference numbers is omitted herein.

Figure 15:
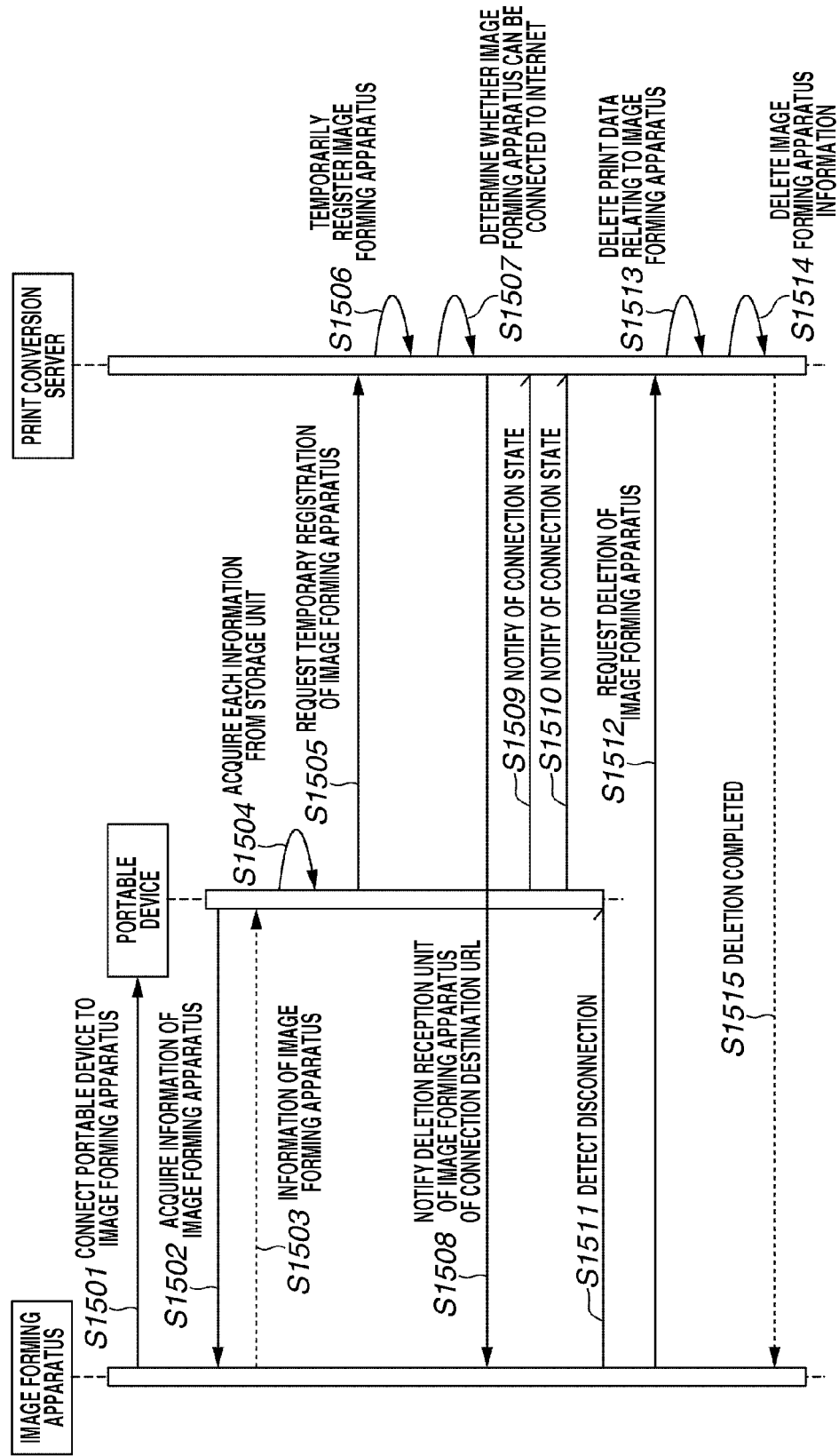
FIG. 15 illustrates a processing sequence according to the third exemplary embodiment.

FIG. 15 illustrates a sequence of processing where the image forming apparatuses 102 and 103 are temporarily registered in a print conversion server 104 or deleted from a print conversion server 104 after an end of temporary temporary use of the image forming apparatuses 102 and 103 according to the third exemplary embodiment. Steps S1501 to S1506 are similar to steps S601 to S606 illustrated in FIG. 6, and as such, a detailed description is omitted herein. In step S1507, the print conversion server 104 determines, based on capability information of the image forming apparatus acquired during the temporary registration, whether the image forming apparatus is connectable to the Internet 100. In other words, whether the image forming apparatus is the image forming apparatus 103 in the system configuration illustrated in FIG. 1. When it is determined that the image forming apparatus is connectable to the Internet 100, in step S1508, the print conversion server 104 notifies the image forming apparatus deletion reception unit 1422 of the image forming apparatus 103. In step S1511, the connection state detection unit 1444 detects disconnection of the image forming apparatus 103 from the portable device 101. Then, in step S1512, the image forming apparatus deletion requesting unit 1443, upon detection of the disconnection, makes a deletion request to the image forming apparatus deletion reception unit 1422.

The method in which the image forming apparatus 103 connects to the Internet 100 may vary depending on specific features of a specific apparatus, such as software configuration/settings, hardware configuration/settings. For example, in one exemplary embodiment, the image forming apparatus 103 can be connected to the Internet 100 by hypertext transfer protocol (HTTP), while in another exemplary embodiment, the image forming apparatus 103 connects by simple mail transfer protocol (SMTP). Thus, when notifying the image forming apparatus 103 of the image forming apparatus deletion reception unit 1422 in step S1508, the print conversion server 104 notifies the image forming apparatus 103 of the image forming apparatus deletion reception unit 1422 by a plurality of connection methods. The image forming apparatus deletion reception unit 1422 based on the connection method is described below, as examples in the case of HTTP, SMTP, and file transfer protocol (FTP). In the examples, the print conversion server 104 sets a specific URL or mail address to each image forming apparatus, and determines that a deletion request has been received when the URL or the mail address is called.

http://www.yyyyyy/xxxxxxxxxxxx
ftp://ftp.yyyyyy/xxxxxxxxxxx
xxxx.xxxx.xxxx@yyyy.com In step S1512, the image forming apparatus 103 makes a deletion request of the image forming apparatus by, among the plurality of notified connection methods, a method notifiable for the image forming apparatus deletion reception unit 1422. This enables the print conversion server 104 to receive the deletion request of the image forming apparatus even when a connection method to the Internet 100 varies from one image forming apparatus to another. The present exemplary embodiment has been described by taking the examples of HTTP, SMTP, and FTP. However, any method can be employed as long as it enables reception of data from the image forming apparatus 103 via the Internet 100. Further, the image forming apparatus 103 may make a deletion request to all the image forming apparatus deletion reception units 1422 instead of determining the image forming apparatus deletion reception unit 1422 capable of notification in step S1512. The plurality of connection methods has been notified. However, a single connection method can be notified. The print conversion server 104 can select a connection method based on device information, and instruct to carry out communication by the selected connection method.

Thus, even in the case of the software configuration where the portable device 101 does not include an CPU 201, the image forming apparatus can be registered in the print conversion server 104 without any time and labor. When disconnected, as in the case of the second exemplary embodiment, information regarding a relevant image forming apparatus can be quickly deleted.

Figure 16:
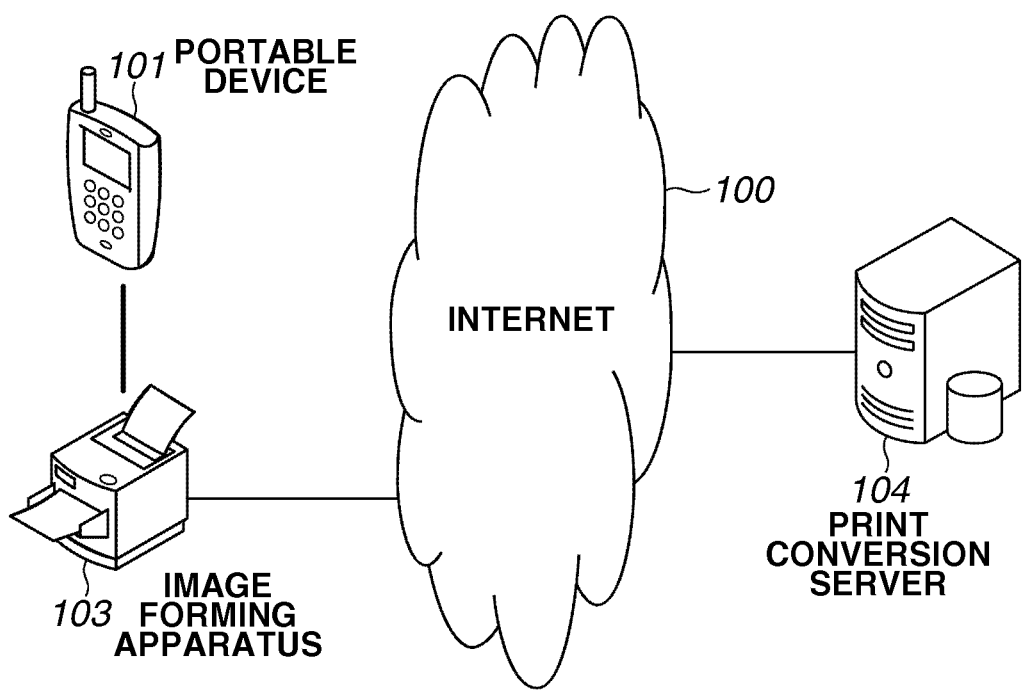
FIG. 16 illustrates a configuration of a printing system according to a fourth exemplary embodiment.

FIG. 16 illustrates a configuration of a printing system according to a fourth exemplary embodiment. A portable device 101, which cannot be connected directly to the Internet 100, is directly connected to an image forming apparatus 103 which is connectable to the Internet 100. A direct connection method is similar to that of the first exemplary embodiment. A print conversion server 104 can communicate with the image forming apparatus 103 via the Internet 100.

In the fourth exemplary embodiment, a hardware configuration of the portable device 101 includes only a storage unit 204 and an external interface 207. For example, the portable device 101 can be realized by a portable USB memory. The portable device 101 includes neither CPU nor ROM, and hence, a program cannot be executed irrespective of a connection state with the image forming apparatus 103.

Figure 17:
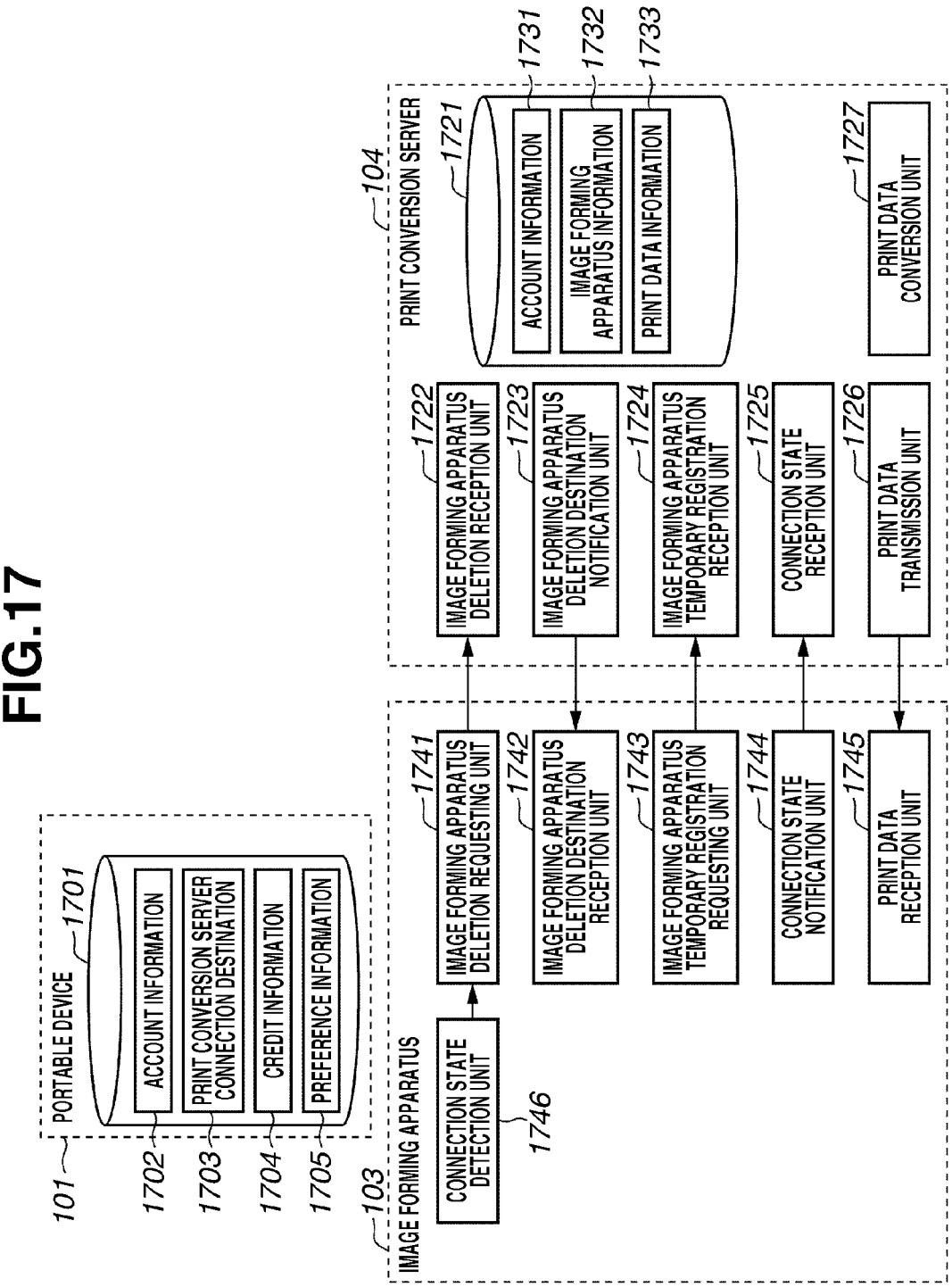
FIG. 17 illustrates a software configuration of each device included in the printing system according to the fourth exemplary embodiment.

FIG. 17 illustrates a software configuration of each device included in the printing apparatus according to the fourth exemplary embodiment. As compared with the software configuration of the first exemplary embodiment illustrated in FIG. 5, the portable device 101 includes only a storage unit 1701. The image forming apparatus 103 includes an image forming apparatus deletion requesting unit 1741, an image forming apparatus deletion destination reception unit 1742, an image forming apparatus temporary registration requesting unit 1743, a connection state detection unit 1744, a print data reception unit 1745, and a connection state detection unit 1746. Reference numbers 1721-1727 and 1731-1733 are equivalent to reference numbers 521-527 and 531-533 in FIG. 5. Thus, a detailed description of these reference numbers is omitted herein.

Figure 18:
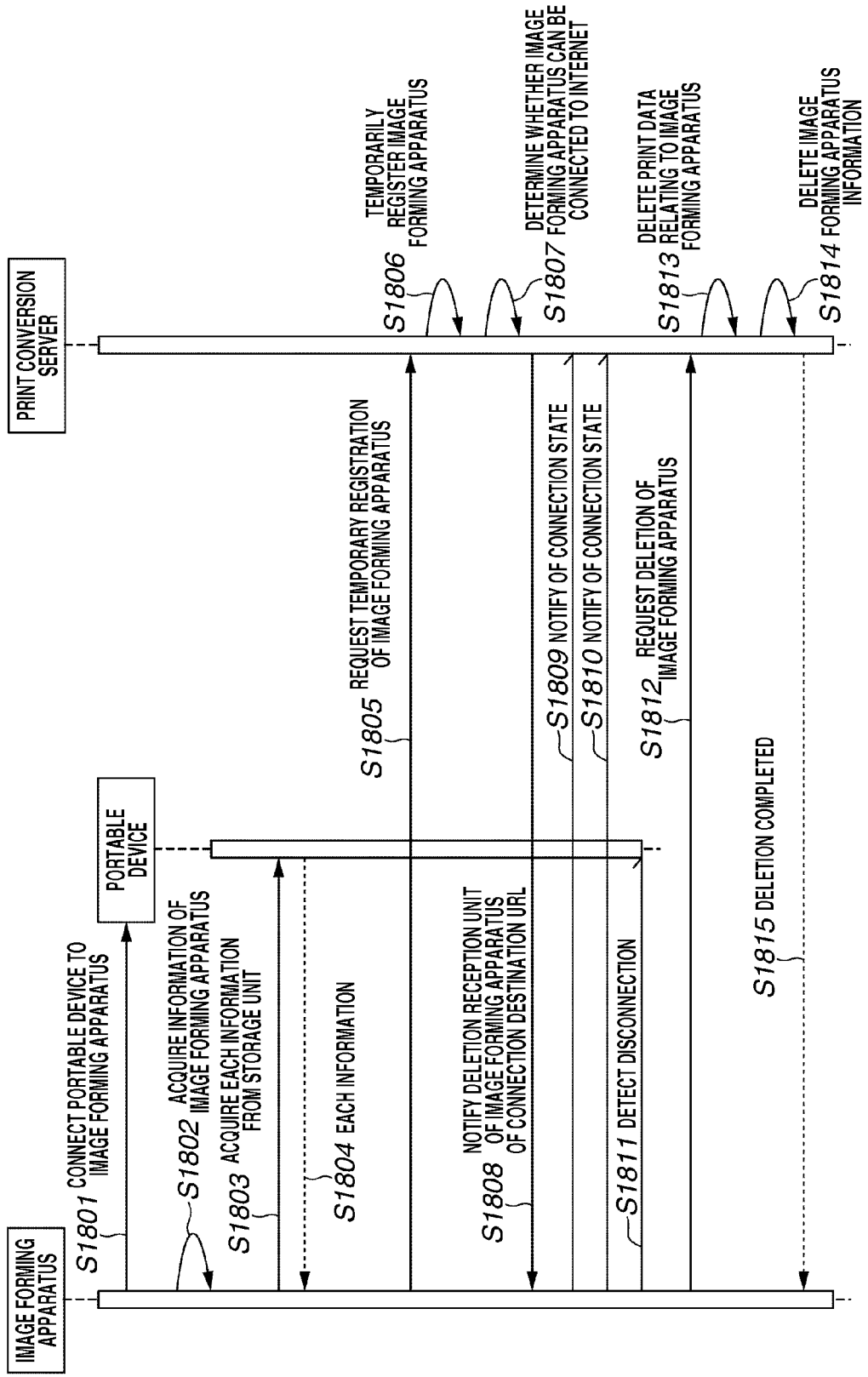
FIG. 18 illustrates a processing sequence according to the fourth exemplary embodiment.

FIG. 18 illustrates a sequence of processing where the image forming apparatus 103 is temporarily registered in the print conversion server 104 and deleted from the print conversion server 104 after an end of temporary use of the image forming apparatus 103. In step S1801, the portable device 101 is connected to the image forming apparatus 103. In step S1802, the image forming apparatus 103 acquires its own image forming apparatus information. Then, in step S1803, the image forming apparatus 103 acquires various pieces of information including account information 1702 and a print conversion server connection destination 1703 from the storage unit 1701 of the portable device 101. The fourth exemplary embodiment is different from the third exemplary embodiment in that the image forming apparatus 103 instead of the portable device 101 executes temporary registration requesting of step S1805 and connection state notification of steps S1809 and S1810. The temporary registration screen of the image forming apparatus displayed on the user interface 206 of the portable device 101 illustrated in FIG. 7 may be displayed on a user interface 309 of the image forming apparatus 103. Other processes are similar to those of the third exemplary embodiment. An image forming apparatus deletion reception unit 1722 may be based on a plurality of connection methods, as in the case of the third exemplary embodiment.

Thus, according to the fourth exemplary embodiment, even in the hardware configuration where the portable device 101 includes only the storage unit 1701, the image forming apparatus 103 can be registered in the print conversion server 104 without any time and labor. When disconnected, as in the case of the second and third exemplary embodiments, information regarding a relevant image forming apparatus can be quickly deleted.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-229654 filed Oct. 12, 2010, which is hereby incorporated by reference herein in its entirety.

What is claimed is:
1. A printing system comprising:
a print conversion server configured to supply print data;

an image forming apparatus configured to execute printing based on the print data; and a portable device, wherein the portable device comprises:

a microprocessor coupled to a memory, wherein the microprocessor is configured to control:

an acquisition unit configured to acquire device information from the image forming apparatus to print the print data supplied from the print conversion server by the image forming apparatus; and a requesting unit configured to request the print conversion server to temporarily register the device information acquired by the acquisition unit;

wherein, the print conversion server comprises:

a microprocessor coupled to a memory, wherein the microprocessor is configured to control:

a reception unit configured to receive the request of temporarily registering the device information of the image forming apparatus from the requesting unit; and a registration unit configured to temporarily register the device information received by the reception unit;

wherein, the microprocessor of the portable device is further configured to control:

a transmission unit configured to transmit, to the print conversion server, information indicating use of the print conversion server at the image forming apparatus corresponding to the temporarily registered device information; and a transmission control unit configured to control the transmission unit not to transmit the information in response to disconnection of communication with the image forming apparatus; and wherein, the microprocessor of the print conversion server is further configured to control:

a supply unit configured to supply, if the information transmitted from the transmission unit is received within a predetermined period of time, the print data to the image forming apparatus corresponding to the device information registered by the registration unit in response to an acquisition request of the print data; and a control unit configured to control, when the information transmitted from the transmission unit is not received within the predetermined period of time, the supply unit not to supply the print data to the image forming apparatus corresponding to the device information registered by the registration unit, wherein the image forming apparatus comprises:

a microprocessor coupled to a memory, wherein the microprocessor is configured to control:

a detection unit configured to detect the disconnection of communication with the portable device; and a requesting unit configured to request, when the detection unit detects the disconnection of the communication with the portable device, the print conversion server to delete the device information corresponding to the image forming apparatus registered by the registration unit.

2. The printing system according to claim 1, wherein:

the registration unit registers the device information by storing the device information in a memory of the print conversion server; and the control unit controls, when the reception unit does not receive the information transmitted from the transmission unit within the predetermined period, the supply unit not to supply the print data to the image forming apparatus corresponding to the device information by deleting the device information registered by the registration unit from the memory of the print conversion server.

3. The printing system according to claim 1, wherein:

the microprocessor of the print conversion server is further configured to control:

a notification unit configured to send notification of a communication method employed when the requesting unit makes the request, wherein the requesting unit requests, based on the communication method notified by the notification unit, the deletion of the device information corresponding to the image forming apparatus registered by the registration unit.

4. The printing system according to claim 1, the transmission unit transmits the information indicating use of the print conversion server at the image forming apparatus corresponding to the temporarily registered device information at a fixed interval.

5. A method for controlling a print conversion server communicable with a portable device that communicates with an image forming apparatus, the method comprising:

receiving a request to register device information of the image forming apparatus, configured to execute printing based on print data, from the portable device;

registering the received device information;

receiving information indicating use of the print conversion server by the image forming apparatus;

supplying, if the information indicating use of the print conversion server is transmitted within a predetermined period of time, print data to the image forming apparatus corresponding to the registered received device information in response to an acquisition request of the print data, wherein if the transmitted information is not received within the predetermined period of time, the print data is not supplied to the image forming apparatus corresponding to the registered device information, receiving a request from the image forming apparatus, when the image forming apparatus detects disconnection of communication with the portable device, to delete the registered received device information corresponding to the image forming apparatus.

6. A non-transitory computer-readable storage medium for storing a program executed by a portable device communicable with a print conversion server configured to supply print data and an image forming apparatus, the program comprising:

acquiring, to print the print data supplied from the print conversion server by the image forming apparatus, device information from the image forming apparatus, which the image forming apparatus is configured to execute printing based on the print data; and requesting the print conversion server to temporarily register the acquired device information;

transmitting, to the print conversion server, information indicating use of the print conversion server at the image forming apparatus, the device information of which has temporarily been registered; and inhibiting the transmission of the information in response to disconnection of communication with the image forming apparatus, wherein when the image forming apparatus detects disconnection of communication with the portable device, the image forming apparatus requests the print conversion server to delete the acquired device information.

* * * * *